(12) United States Patent
Cervello et al.

(10) Patent No.: US 12,231,420 B2
(45) Date of Patent: Feb. 18, 2025

(54) SINGLE SIGN-ON (SSO) IDENTIFICATION ACROSS NETWORKS

(71) Applicant: Fortinet, Inc., Sunnyvale, CA (US)

(72) Inventors: Jaume Cervello, Cambrils (ES); Jordi Garcia Alvarez, Barcelona (ES)

(73) Assignee: Fortinet, Inc., Sunnyvale, CA (US)

( * ) Notice: Subject to any disclaimer, the term of this patent is extended or adjusted under 35 U.S.C. 154(b) by 37 days.

(21) Appl. No.: 18/217,439

(22) Filed: Jun. 30, 2023

(65) Prior Publication Data
US 2025/0007899 A1    Jan. 2, 2025

(51) Int. Cl.
| G06F 15/16 | (2006.01) |
| G06F 9/54 | (2006.01) |
| H04L 9/40 | (2022.01) |
| H04L 29/06 | (2006.01) |
| H04L 61/5014 | (2022.01) |

(52) U.S. Cl.
CPC ...... H04L 63/0815 (2013.01); H04L 61/5014 (2022.05)

(58) Field of Classification Search
CPC .......... H04L 63/0815; H04L 61/5014
USPC ............................................. 726/5
See application file for complete search history.

(56) References Cited

U.S. PATENT DOCUMENTS

| 6,862,286 | B1 * | 3/2005 | Tams ................. H04L 61/5061 370/395.54 |
| 9,769,115 | B2 * | 9/2017 | Nantel ................ H04L 12/2801 |
| 10,237,294 | B1 * | 3/2019 | Zadeh ...................... H04L 61/45 |
| 10,891,372 | B1 * | 1/2021 | Shahbazi ............ H04L 63/0815 |
| 11,552,975 | B1 * | 1/2023 | Zhang .................. H04L 67/125 |
| 2007/0121617 | A1 * | 5/2007 | Kanekar ................ H04L 45/586 370/389 |
| 2015/0089614 | A1 * | 3/2015 | Mathew ............. H04L 65/1069 726/7 |
| 2015/0193524 | A1 * | 7/2015 | Williams ............. G06F 21/577 707/740 |
| 2016/0315907 | A1 * | 10/2016 | Nantel ................ H04L 61/5014 |
| 2018/0308111 | A1 * | 10/2018 | Bigbee ................ H04L 61/5014 |
| 2019/0306182 | A1 * | 10/2019 | Fry ......................... H04L 67/10 |
| 2021/0328986 | A1 * | 10/2021 | Vasseur ................... H04L 63/20 |
| 2021/0377253 | A1 * | 12/2021 | Robbins ................ H04L 9/3239 |
| 2022/0210079 | A1 * | 6/2022 | Koren ..................... G06F 18/24 |
| 2022/0286454 | A1 * | 9/2022 | Cohen ..................... H04L 63/20 |

(Continued)

*Primary Examiner* — Hamza N Algibhah
(74) *Attorney, Agent, or Firm* — Law Office of Dorian Cartwright; Dorian Cartwright (57) ABSTRACT

The DHCP requests can be sent by endpoints to get first IP addresses. SSO data concerning the endpoints is collected using an identity service. A DHCP fingerprint is generated for of the each endpoints, including the first IP addresses. DHCP fingerprints are stored to an SSO unification database along with corresponding SSO data for the endpoints at the first IP addresses, including a specific endpoint at a first IP address on the wired network. While tracking, the specific endpoint is subsequently detected at a second IP address on the wireless network. The new IP address can be responsive to a transition by the specific endpoint from the wired network to the wireless network, or visa versa. The detection is based on matching a DHCP fingerprint of the specific endpoint to a record of the SSO unification database, and checked to see if the IP addresses are consistent. An SSO authentication transaction is performed to reauthenticate the specific endpoint.

10 Claims, 6 Drawing Sheets

(56) References Cited

U.S. PATENT DOCUMENTS

| | | | |
|---|---|---|---|
| 2022/0286457 A1* | 9/2022 | Cohen | H04L 63/102 |
| 2023/0231860 A1* | 7/2023 | Tian | G06N 5/022 |
| | | | 726/1 |
| 2023/0388285 A1* | 11/2023 | Mehra | H04L 63/10 |

* cited by examiner

SINGLE SIGN-ON (SSO) IDENTIFICATION ACROSS NETWORKS

FIELD OF THE INVENTION

The invention relates generally to computer networks, and more specifically, to single sign-on (SSO) identification for a device moving across networks of a data communication network.

BACKGROUND

SSO is an authentication scheme that allows users to log in with a single ID to any of several related software systems, without having to reenter authentication factors. A single authentication provides access to multiple applications by passing an authentication token seamlessly to configured applications. One example of SSO uses cookies.

One of the challenges when SSO is deployed is keeping the endpoint IP address updated when network roaming occurs. SSO can be based on windows logon/logoff so when users moves from cable network to Wi-Fi network this logon/logoff is not notice by the Windows AD and log events. Additionally, a user can plug in a wireless device, or move from one wired network to another wired network. So SSO collectors cannot change SSO information updating the new or additional IP and the user is not able to match with user based policies. This can disrupt voice and video calls. Some accounts may be logged out, and activity lost, due to losing authentication.

As a consequence, users typically need to reauthenticate over the new network connection. Reauthentication disrupts the whole point of SSO to reduce log ons.

What is needed is a robust technique for SSO identification for a device moving across networks of a data communication network.

SUMMARY

To meet the above-described needs, methods, computer program products, and systems for SSO identification across networks of a data communication network.

In one embodiment, SSO tracking is configured. DHCP requests are listened to over a wired network and a wireless network to identify endpoints discovering a DHCP server. The DHCP requests can be sent by endpoints to get first IP addresses. SSO data concerning the endpoints is collected using an identity service. A DHCP fingerprint is generated for of the each endpoints, including the first IP addresses. DHCP fingerprints are stored to an SSO unification database along with corresponding SSO data for the endpoints at the first IP addresses, including a specific endpoint at a first IP address on the wired network.

In another embodiment, SSO fingerprints are tracked. While tracking, the specific endpoint is subsequently detected at a second IP address on the wireless network. The new IP address can be responsive to a transition by the specific endpoint from the wired network to the wireless network, or visa versa. The detection is based on matching a DHCP fingerprint of the specific endpoint to a record of the SSO unification database, and checked to see if the IP addresses are consistent.

In yet another embodiment, SSO tracking is updated. The record of the SSO unification database is updated along with corresponding SSO data for the specific endpoint at the second IP address. An SSO authentication transaction is performed to reauthenticate the specific endpoint. In one case an IP address is used in authentication and in another case the network authentication device vouches for IP verification.

Advantageously, computer networking is improved with better performance when roaming around networks.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for SSO identification across networks of a data communication network. One of ordinary skill in the art will recognize many alternative embodiments that are not explicitly listed based on the following disclosure. For example, the techniques can apply to log on services other than SSO to avoid reauthentication.

I. Network Systems for SSO Identification Across Networks (FIGS. 1-2)

Figure 1:
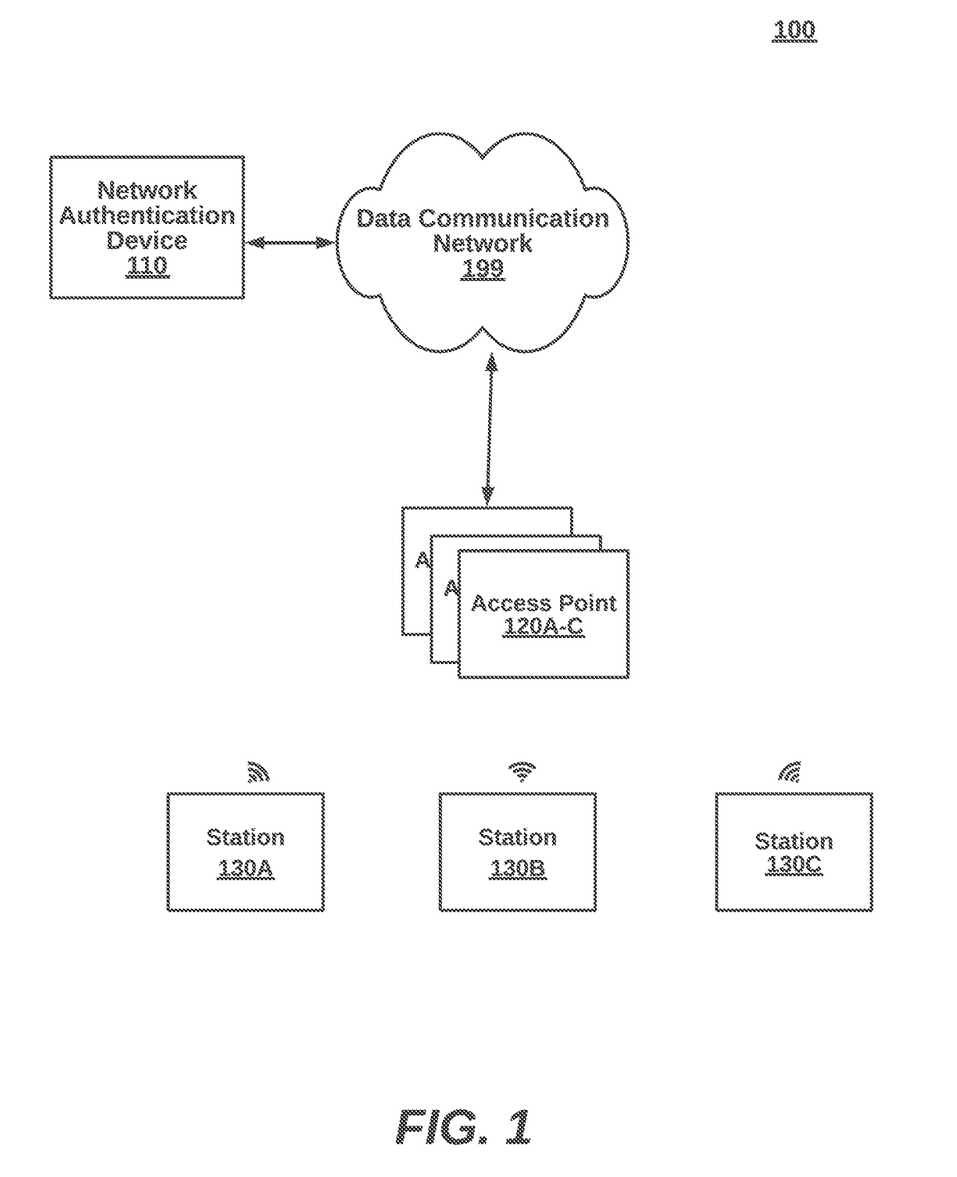
FIG. 1 is a high-level block diagram illustrating a network system for SSO identification across networks of a data communication network, according to one embodiment.
Figure 2:
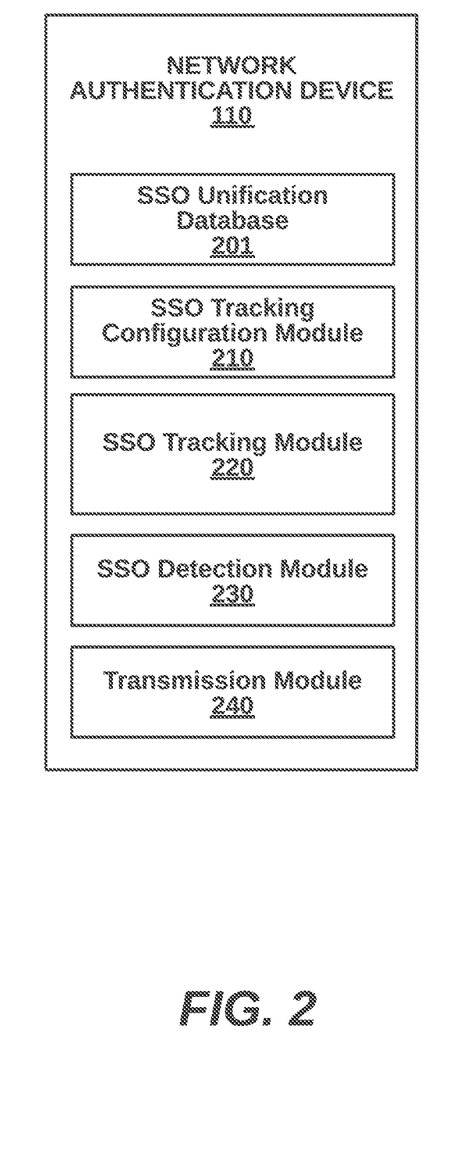
FIG. 2 is a more detailed block diagram illustrating a network authentication device of the system of FIG. 1, according to one embodiment.

FIG. 1 is a high-level block diagram illustrating a network system 100 for SSO identification across networks, according to one embodiment. The network system 100 includes a network authentication device 110, Wi-Fi controller 115, a group of access points 120A-C and stations 130A-C. Other embodiments of the system 100 can include additional components that are not shown in FIG. 1, such as controllers, network gateways, routers, switches, additional access points, and additional wired or wireless stations. Many variations are possible. The components are implemented in hardware, software, or a combination of both, as shown in the example below of FIG. 6.

The network authentication device 110 can be coupled to a data communication network 199 such as a private network connected to the Internet. The network authentication device 110 can be connected to the data communication system via hard wire (e.g., Ethernet). The access points 120A-C can be connected to the data communication system 199 both via hard wire and via wireless networking, and serve as a bridge for access back and forth. The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPV6 address spaces.

The network authentication device 110 (e.g., FORTIAuthenticator) keeps IP addresses updated for endpoints in order to maintain SSO continuity. The network authentication device 110 can authenticate to other network devices on behalf of endpoints. In one embodiment, a separate server performs authentication and in other embodiments, authentication is integrated into access points, routers, Wi-Fi controllers, gateways or the like.

The access points 120A-C serve as a common point for all wireless stations. Thus, the IP addresses for wireless stations and monitoring can be done from this perspective, in some embodiments. Data packets can be forwarded to the network authentication device 110 for processing after any local pre-processing.

The stations 130A-C may move from one network to another. For example, a roaming mobile device moves from one wireless network (or subnet) to another wireless network. A laptop can be plugged in from a wireless network to a wired network. A VOIP app may automatically transfer a device from a wireless network to a wired network for better performance.

FIG. 2 is a more detailed block diagram illustrating the network authentication device point 110 of FIG. 1, according to an embodiment. The network authentication device 110 includes a tracking configuration module 210, an SSO tracking module 220, an SSO tracking update module 230, and a transmission module 240. Components can be implemented in software and/or hardware. Many other variations of components are possible.

The SSO tracking configuration module 210 listens, through a plurality of network devices (e.g., access points and network gateways), to DHCP requests over a wired network and a wireless network to identify endpoints discovering an DHCP server, the DHCP requests sent by endpoints to get first IP addresses. The tracking configuration module 210 collects SSO data concerning the endpoints using an identity service. A DHCP fingerprint is generated for of the each endpoints, including the first IP addresses.

An SSO unification database 201 stores the new DHCP fingerprint to a repository of existing DHCP fingerprints. Each record includes SSO data corresponding to the endpoints at the first IP addresses, including a specific endpoint at a first IP address on the wired network.

The SSO tracking module 220 to subsequently detect the specific endpoint at a second IP address on the wireless network, responsive to a transition by the specific endpoint from the wired network to the wireless network. The detection can be based on matching a DHCP fingerprint of the specific endpoint to a record of the SSO unification database.

The SSO tracking update module 230 CAN update the record of the SSO unification database along with corresponding SSO data for the specific endpoint at the second IP address. The tracking update module 230 can also trigger reauthentication for the specific endpoint at the new IP address.

The transmission module 240 then transmits data packets to other network components over the Ethernet or other mediums. One hardware embodiment includes Wi-Fi transceivers that signal across a wireless channel. Hardware adjustments are made to turn in specific bandwidth and spectrum.

Figure 4:
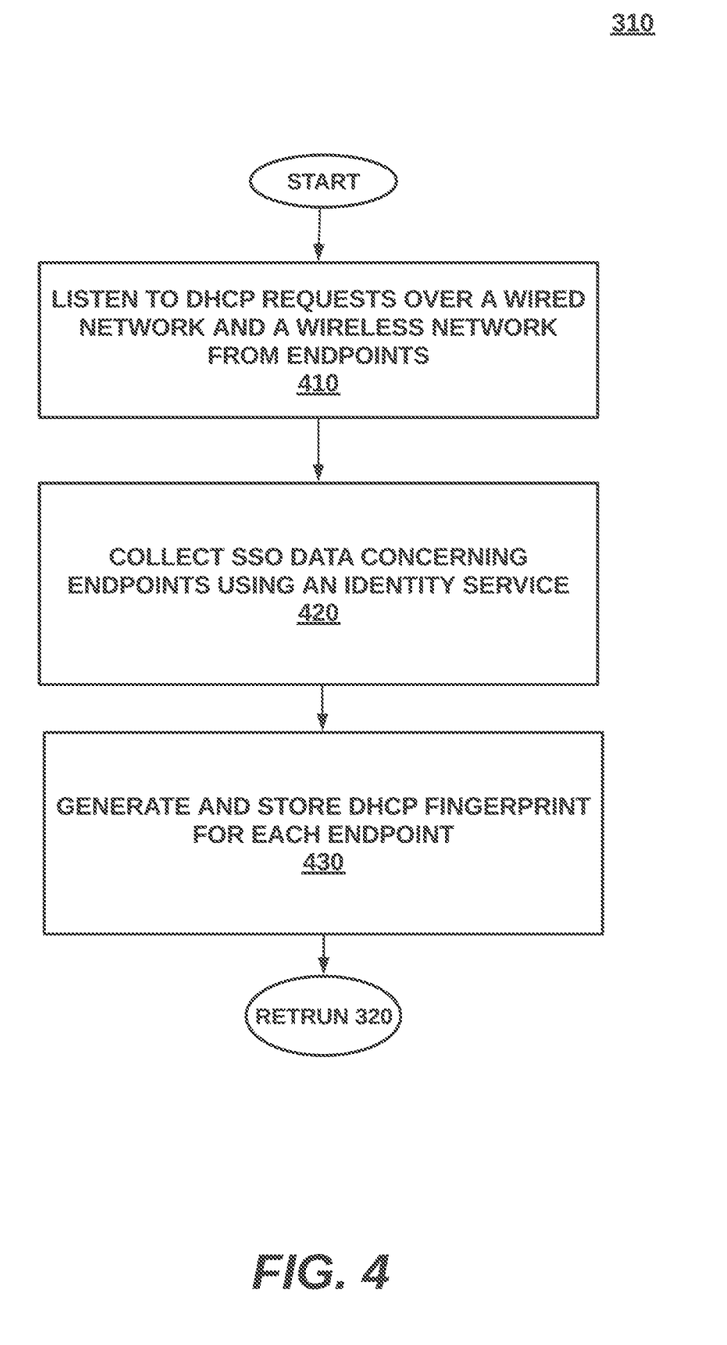
FIG. 4 is a more detailed flow chart for a step of configuring SSO tracking for stations, from the method of FIG. 3, according to one embodiment.
Figure 5:
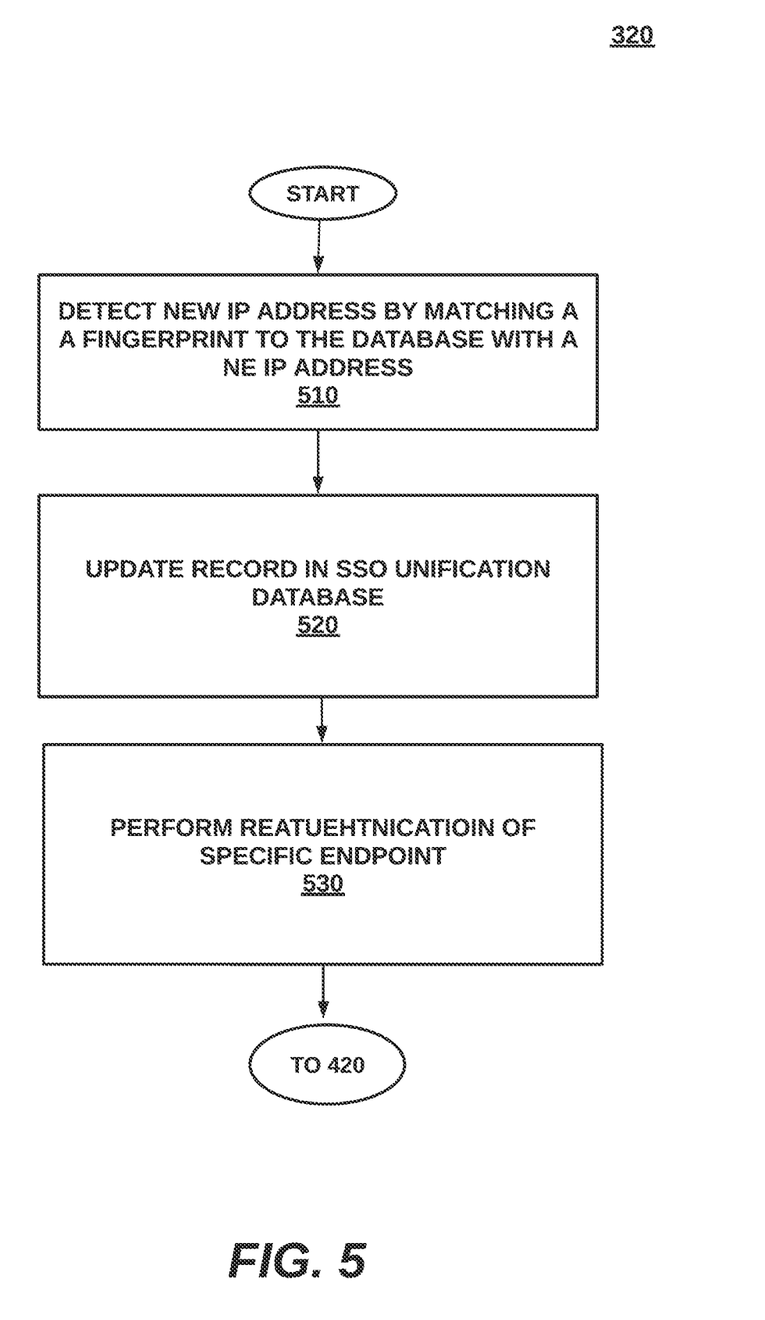
FIG. 5 is a more detailed flow chart for a step of updating SSO tracking for stations with updated IP addresses, from the method of FIG. 3, according to one embodiment.

II. Methods for SSO Identification Across Networks (FIGS. 3-5)

Figure 3:
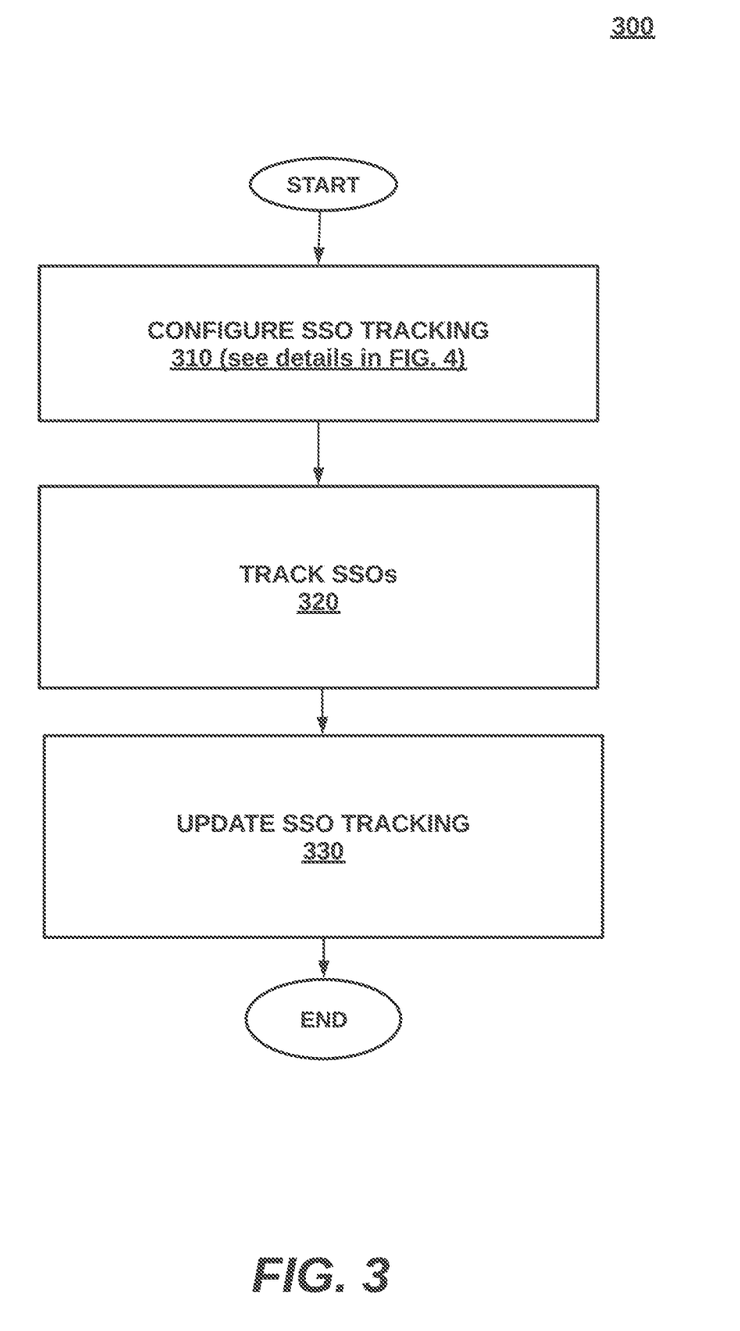
FIG. 3 is a high-level flow chart for SSO identification across networks of a data communication network, according to an embodiment.

FIG. 3 is a high-level flow diagram illustrating a method 300 for SSO identification across networks of a data communication network, according to an embodiment. The method 400 can be implemented by, for example, system 100 of FIG. 1.

At step 310, SSO tracking is configured. A more detailed example of step 310 for adjusting transmission bandwidth usage using dynamic puncturing, is shown in FIG. 4, according to one embodiment. More specifically, DHCP requests are listened to over a wired network and a wireless network to identify endpoints discovering a DHCP server, at step 410. The DHCP requests can be sent by endpoints to get first IP addresses. At step 420, collecting SSO data concerning the endpoints using an identity service. At step 430, generating a DHCP fingerprint for of the each endpoints, including the first IP addresses. The DHCP fingerprint is stored to an SSO unification database along with corresponding SSO data for the endpoints at the first IP addresses, including a specific endpoint at a first IP address on the wired network.

Returning to FIG. 3, at step 320, SSO fingerprints are tracked. While tracking, the specific endpoint is subsequently detected at a second IP address on the wireless network. The new IP address can be responsive to a transition by the specific endpoint from the wired network to the wireless network, or visa versa. The detection is based on matching a DHCP fingerprint of the specific endpoint to a record of the SSO unification database, and checking to see if the IP addresses are consistent.

At step 330, SSO tracking is updated, as shown in FIG. 5, according to one embodiment. In particular, at step 510, the record of the SSO unification database is updated along with corresponding SSO data for the specific endpoint at the second IP address. At step 520, an SSO authentication transaction is performed to reauthenticate the specific endpoint. In one case an IP address is used in authentication and in another case the network authentication device vouches for IP verification.

III. Computing Device for SSO Identification Across Networks (FIG. 6)

Figure 6:
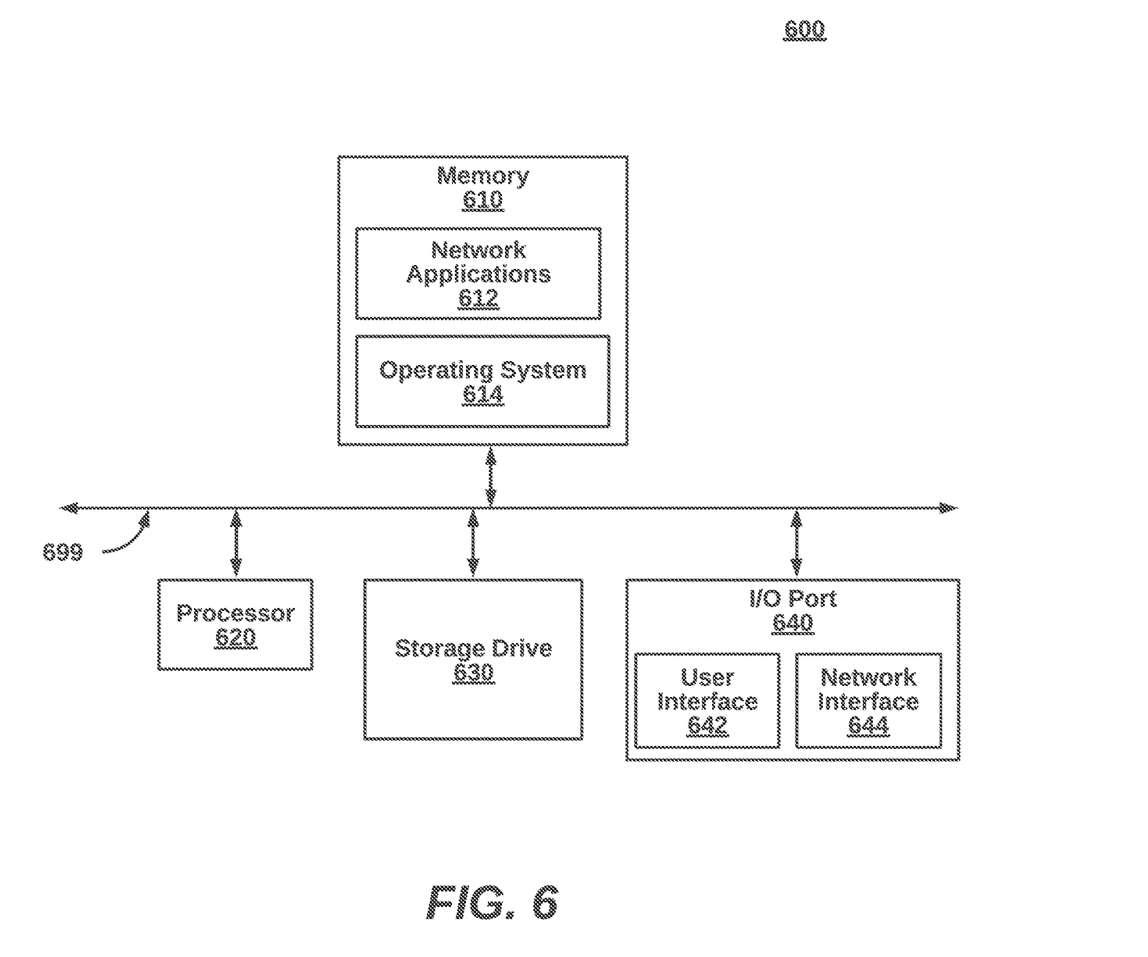
FIG. 6 is a block diagram illustrating an example computing device implementing the network system of FIG. 1, according to one embodiment.

FIG. 6 is a block diagram illustrating a computing device 600 implementing the packet processor 100 of FIG. 1, according to one embodiment. The computing device 600 is a non-limiting example device for implementing each of the components of the system 100, including the network authentication device 110, the Wi-Fi controller 115, access points 120A-C and stations 130A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A method in a network authentication device for Single Sign-On (SSO) identification across networks of a data communication network, the method comprising the steps:

listening, through a plurality of access points, to Dynamic Host Configuration Server Protocol (DHCP) requests over a wired network and a wireless network to identify endpoints discovering an DHCP server, the DHCP requests sent by endpoints to get first IP addresses;

collecting SSO data concerning the endpoints using an identity service;

generating a DHCP fingerprint for each of the endpoints, including the first IP addresses;
storing DHCP fingerprint to an SSO unification database along with corresponding SSO data for the endpoints at the first IP addresses, including a specific endpoint at a first IP address on the wired network;
subsequently detecting the specific endpoint at a second IP address on the wireless network, responsive to a transition by the specific endpoint from the wired network to the wireless network, the detection based on matching a DHCP fingerprint of the specific endpoint to a record of the SSO unification database;
updating the record of the SSO unification database along with corresponding SSO data for the specific endpoint at the second IP address; and
performing an SSO authentication transaction to reauthenticate the specific endpoint.

2. The method of claim 1, the DHCP fingerprint uniquely identifies each of the endpoints from the DHCP requests.

3. The method of claim 1, the DHCP fingerprint is derived from one or more of operating system type, operating system version, MAC address, hardware vendor (UID), and IP address.

4. The method of claim 1, wherein the DHCP requests are responsive to DHCP offers sent by the DHCP server.

5. The method of claim 1, wherein the identity service comprises at least one of radius, syslog, saml, active directory.

6. The method of claim 1, the listening includes transactions collected from L3 network devices.

7. The method of claim 1, wherein the updating the record of the SSO unification database further comprises deleting the first IP address.

8. The method of claim 1, further comprising: subsequently detecting the specific endpoint at a third IP address on the wireless network, responsive to a transition by the specific endpoint from the wireless network back to the wired network, the detection based on matching a DHCP fingerprint of the specific endpoint to a record of the SSO unification database, the DHCP fingerprint discovered in a DHCP request.

9. A non-transitory computer-readable medium storing computer-readable instructions in a network authentication device that, when executed by a processor, perform a method for Single Sign-On (SSO) identification across networks of a data communication network, the method comprising:
listening, through a plurality of access points, to Dynamic Host Configuration Server Protocol (DHCP) requests over a wired network and a wireless network to identify endpoints discovering an DHCP server, the DHCP requests sent by endpoints to get first IP addresses;
collecting SSO data concerning the endpoints using an identity service;
generating a DHCP fingerprint for of the each endpoints, including the first IP addresses;
storing DHCP fingerprint to an SSO unification database along with corresponding SSO data for the endpoints at the first IP addresses, including a specific endpoint at a first IP address on the wired network;
subsequently detecting the specific endpoint at a second IP address on the wireless network, responsive to a transition by the specific endpoint from the wired network to the wireless network, the detection based on matching a DHCP fingerprint of the specific endpoint to a record of the SSO unification database;
updating the record of the SSO unification database along with corresponding SSO data for the specific endpoint at the second IP address; and
performing an SSO authentication transaction to reauthenticate the specific endpoint.

10. A network authentication device for Single Sign-On (SSO) identification across networks of a data communication network, for preventing connections from Wi-Fi 6E stations to rogue Wi-Fi 6E access points, the Wi-Fi 6E access point comprising:
a processor;
a network communication module, communicatively coupled to the processor and to the data communication network; and
a memory, communicatively coupled to the processor and storing:
listening, through a plurality of access points, to Dynamic Host Configuration Server Protocol (DHCP) requests over a wired network and a wireless network to identify endpoints discovering an DHCP server, the DHCP requests sent by endpoints to get first IP addresses;
collecting SSO data concerning the endpoints using an identity service;
generating a DHCP fingerprint for of the each endpoints, including the first IP addresses;
storing DHCP fingerprint to an SSO unification database along with corresponding SSO data for the endpoints at the first IP addresses, including a specific endpoint at a first IP address on the wired network;
subsequently detecting the specific endpoint at a second IP address on the wireless network, responsive to a transition by the specific endpoint from the wired network to the wireless network, the detection based on matching a DHCP fingerprint of the specific endpoint to a record of the SSO unification database;
updating the record of the SSO unification database along with corresponding SSO data for the specific endpoint at the second IP address; and
performing an SSO authentication transaction to reauthenticate the specific endpoint.

\* \* \* \* \*